United States Patent
Onno et al.

(10) Patent No.: US 9,942,544 B2
(45) Date of Patent: Apr. 10, 2018

(54) METHOD AND DEVICE FOR DERIVING A SET OF ENABLED CODING MODES

(71) Applicant: CANON KABUSHIKI KAISHA, Tokyo (JP)

(72) Inventors: Patrice Onno, Rennes (FR); Christophe Gisquet, Rennes (FR); Guillaume Laroche, Rennes (FR); Edouard Francois, Bourg des Comptes (FR)

(73) Assignee: Canon Kabushiki Kaisha, Tokyo (JP)

(*) Notice: Subject to any disclaimer, the term of this patent is extended or adjusted under 35 U.S.C. 154(b) by 1178 days.

(21) Appl. No.: 14/038,493

(22) Filed: Sep. 26, 2013

(65) Prior Publication Data
US 2014/0092959 A1    Apr. 3, 2014

(51) Int. Cl.
| | |
|---|---|
| H04N 19/103 | (2014.01) |
| H04N 19/176 | (2014.01) |
| H04N 19/147 | (2014.01) |
| H04N 19/30 | (2014.01) |
| H04N 19/139 | (2014.01) |

(52) U.S. Cl.
CPC ..... *H04N 19/00018* (2013.01); *H04N 19/103* (2014.11); *H04N 19/147* (2014.11); *H04N 19/176* (2014.11); *H04N 19/30* (2014.11)

(58) Field of Classification Search
CPC .............. H04N 19/00018; H04N 19/00424
See application file for complete search history.

(56) References Cited

U.S. PATENT DOCUMENTS

| | | | |
|---|---|---|---|
| 7,317,759 B1 * | 1/2008 | Turaga | H04N 19/147 375/240.01 |
| 2010/0033594 A1 * | 2/2010 | Maruyama | H04N 19/139 348/222.1 |

FOREIGN PATENT DOCUMENTS

| | | |
|---|---|---|
| CN | 102665079 A | 9/2012 |
| WO | WO2010/135609 A1 | 11/2010 |
| WO | WO2011/088593 A1 | 7/2011 |
| WO | WO2012/103750 A1 | 8/2012 |

* cited by examiner

Primary Examiner — Obafemi Sosanya
(74) Attorney, Agent, or Firm — Canon USA, Inc., IP Division

(57) ABSTRACT

A method for deriving a set of enabled coding modes relative to the encoding of an image or image portion which forms part of an image sequence. The method comprises:
  obtaining information associated with coding modes of one or more previously encoded images of the sequence, and
  selectively enabling for the current image or image portion, coding modes based on said obtained information.

27 Claims, 14 Drawing Sheets

METHOD AND DEVICE FOR DERIVING A SET OF ENABLED CODING MODES

REFERENCE TO RELATED APPLICATIONS

This application claims the benefit under 35 U.S.C. § 119(a)-(d) of United Kingdom Patent Application No. 1217446.2, filed on Sep. 28, 2012 and entitled "Method and device for deriving a set of enabled coding modes." The above cited patent application is incorporated herein by reference in its entirety.

FIELD OF THE INVENTION

The invention relates to adaptive coding modes selection for multi-layer video coding and decoding. Particularly, but not exclusively, the invention relates more specifically to the scalable extension of the High Efficiency Video Coding (HEVC) standard under development.

DESCRIPTION OF THE PRIOR ART

The invention relates to adaptive coding modes selection in particular for multi-layer video coding.

It is reminded that a coding mode is a mode relative to an image encoding. This coding mode is used at the encoder but also at the decoder, which can decode encoded data in the received bitstream for deducing the coding mode used at the encoder or which can decode the received bitstream and process the reconstructed images for determining the coding mode. The decoder can also infer or deduce the coding mode from decoded data of the bitstream.

For example, the coding mode can be the intra-prediction mode or the inter-layer prediction mode. The coding mode can also relate to other processes than the prediction, such as the transform. One first mode corresponds to a first type of transform, a second type to a second type of transform. Similarly, several modes of quantization can be considered: scalar quantization, vector quantization. Another example is the modes of scanning the transformed coefficients: horizontal scanning, vertical scanning, diagonal scanning, zig-zag scanning.

Multi-layer video coding applies to video content made of several versions of the same content, represented for instance at different spatial resolutions, or for different point of views. Each version corresponds to a so-called video layer and actually consists in a video sequence. Dependencies between these different layers can generally be exploited for a more efficient compression of the content.

For example, in spatial scalability, each layer corresponds to a video at different spatial resolution, for instance, 1920× 1080 pixels for the first layer, 3840×2160 for the second layer. The successive layers imply an increasing spatial resolution from the first layer also called base layer.

In multi-layer video coding, the coding of a given layer (except the first one, which is the base layer) is based on one or several other layers. This dependency impacts the mode usage and it often turns out that some coding modes are much less useful than other ones. This of course depends on the image content and on the coding parameters.

As an example, FIG. 1 illustrates a multi-layer structure with two spatial layers, one base layer 1 (BL) and one enhancement layer 2 (EL). Each layer is made of four pictures 10 (BL0/EL0), 11 (BL1/EL1), 12(EL2/BL2) and 13(BL3/EL3). The coding of the EL pictures depends on data coming from the coded BL pictures. This is inter-layer dependency symbolized by an arrow linking the base layer image to its corresponding enhancement image. Inside a layer, pictures may also depend from other pictures of the same layer: this is temporal inter-dependency.

In video coding, the coding entities (e.g. macroblocks or coding units) may be coded according to several coding modes. Possibly, depending on the considered group of coding entities (for example, group of pictures, pictures, slices), different sets of coding modes are enabled. Nevertheless these sets are predetermined and cannot generally be adaptively modified, which may impact the encoding and decoding complexity, and the coding efficiency.

Moreover, in the prior art, many coding modes may be used when encoding a video. In particular, in a multi-layer scalable framework, additional inter-layer prediction modes are added to the usual intra and inter prediction modes. The usage of these inter-layer modes makes the behavior of the enhancement layers coding quite different from the base layer in terms of mode usage.

Some solutions are provided in the prior art for improving the mode decision process. For example, U.S. Pat. No. 7,317,759 describes a probabilistic model which is determined from chosen features of a first portion of a video. The probabilistic model is then used to evaluate the cost of different modes for a second portion from chosen features of the first portion.

However a drawback of this method is that no explicit evaluation of each mode is described. The goal is only to speed-up the mode decision process at the encoder, by avoiding exhaustive computations of the coding of the modes. But this does not imply an optimal choice of the mode for the second portion.

In other words, this US patent proposes to select, for a portion of an image, one mode among a fixed list of modes according to the values of chosen features, even if this chosen mode is not optimal.

The present invention has been devised to address one or more of the foregoing concerns.

SUMMARY OF THE INVENTION

According to a first aspect of the invention there is provided a method for deriving a set of enabled coding modes relative to the encoding of an image or image portion which forms part of an image sequence, the method comprising:
  obtaining information associated with coding modes of one or more previously encoded images of the sequence, and
  selectively enabling, for the current image or image portion, coding modes based on said obtained information.

In other words, the invention proposes to select the modes for a given group of coding entities (forming an image or image portion), based on the previously encoded images or groups of coding entities.

The groups of coding entities used to select the modes for the current group of coding entities are called dependency groups of coding entities.

The invention has notably the advantages of:
speeding up of the encoding process, since unnecessary coding modes are not checked and only relevant coding modes are tested by the encoding process; and
saving of bandwidth by avoiding the usage of non-relevant coding modes, signaling bits can be saved, potentially resulting in coding efficiency gains (reduced required bandwidth).

The invention concerns coding modes relative to the coding of the image or image portion. But, of course it can be implemented both at the encoder or decoder side.

In an embodiment, said one or more previously encoded images may form a dependency set, and said dependency set may be selected based on the similarities between the current image and the previously encoded images.

Said differently, the considered previously images are limited to images having similar coding characteristics as the current image or image portion.

This has the advantage of speeding up the process by taking into account only images which can be relevant for the current image, thanks to these similarities.

In an embodiment, evaluating the similarities may be based on the value of at least one characteristic of the considered image, which belongs to a list including the temporal stamp corresponding to the display order of the image, the coding stamp corresponding to the coding order of the image, the index of temporal layer which includes the considered image, quantization parameters, Lagrangian parameters, and the type of image or image portion.

In an embodiment a previously encoded image may be included in the set of dependency if:
  it belongs to a set of images delimited by a predefined period including the current image,
  it has the same type as the current image, and
  it belongs to the same temporal layer or the immediately lower temporal layer.

In an embodiment, a previously encoded image may be included in the set of dependency if:
  it belongs to a set of images delimited by a predefined period including the current image,
  it has the same type as the current image, and
  it has the same quantization parameter as, or the closest lower quantization parameter to, the current image.

In an embodiment, if the current image belongs to one of the P lowest layers of a scalable video data including the current image, P being an integer, a previously encoded image is included in the set of dependency if:
  it belongs to a set of images delimited by a predefined period including the current image,
  it has the same type as the current image, and
  it belongs to the same temporal layer,
otherwise the method further comprises another step for enabling all the possible coding modes for encoding the layers above the second layer in the current image.

In an embodiment, if the current image belongs to one of the P lowest layers of a scalable video data including the current image, P being an integer, a previously encoded image may be included in the set of dependency if:
  it belongs to a set of images delimited by a predefined period including the current image,
  it has the same type as the current image, and
  it has the same quantization parameter as the current image,
otherwise the method further comprises another step for enabling all the possible coding modes for encoding the layers above the second layer in the current image.

In an embodiment, if the current image belongs to the P lowest layers of a scalable video data including the current image, P being an integer, a previously encoded image may be included in the set of dependency if:
  it belongs to a set of images delimited by a predefined period including the current image,
  it has the same type as the current image, and
  it has the same Lagrangian parameter as the current image,
otherwise the method further comprises a step for authorizing all the possible coding modes for encoding the current image.

In an embodiment, P may be set equal to the total number of layers in the scalable video, minus 2.

In an embodiment, evaluating the similarities between the current image and the previously encoded images may comprise calculating a distance D function on characteristics $D[VC^{curr},VC]$ where $VC^{curr}$ is a vector of chosen characteristics about the current image, and VC a vector of chosen characteristics about the considered previously encoded image.

In an embodiment, each vector may be defined by $VC=[VC_0, \ldots, VC_N]^T$, wherein T is a transposition operator, N is an integer and $VC_i$ with $i\in[0,N]$ is a given characteristic.

In an embodiment, it may follow that:

$$D[VC^{curr},VC]=w_0 \cdot d(VC_0^{curr},VC_0)+ \ldots + w_i \cdot d(VC_i^{curr},VC_i)+ \ldots +w_N \cdot d(VC_N^{curr},VC_N)$$

where $w_i$ is a weighting factor related to the corresponding characteristic $VC_i$, and $d(VC_i^{curr},VC_i)$ is a distance measured between characteristics $VC_i^{curr}$ and $VC_i$.

In an embodiment, the step for identifying the set of dependency may comprise, for each previously encoded image, comparing the calculated distance $D[VC^{curr},VC]$ with a predetermined threshold $\lambda$, and adding the considered previously encoded image to the set of dependency's images if $D \leq \lambda$.

In another embodiment the step of selectively enabling the coding modes may be based on statistics related to the enabled coding modes of the one or more previously encoded images.

In an embodiment, the step of selectively enabling the coding modes may further comprise a step of resetting the enabled coding modes for a current image by enabling all the possible coding modes for the current image.

In an embodiment, the step of selectively enabling (or selecting the enabled) coding modes for the current image may comprise:
  a step for analyzing said statistics computed on the previously encoded images, the statistics being related to the coding modes enabled in the previously encoded images, and
  a step for deducing from the analyzed statistics the enabled coding modes for the current image.

In an embodiment, a step of processing the current image may comprise:
  a step of computing the statistics on the current image based on the current image's enabled coding modes, and
  a step of storing said current image's computed statistics for the step of selectively enabling coding modes for a further image.

In an embodiment, an image is divisible into coding units which are further divisible into pixels, and the step of computing the statistics on a current image may comprise for each coding unit $CU_k$ of the current image, $k=1, \ldots, N_{CU}$, k being the index of the coding unit and $N_{CU}$ the total number of coding units in the current image:
  a) a step of identifying a best mode $m_i$ of the considered coding unit $CU_k$ among $N_m$ possible coding modes for the current image,
  b) a step of updating a first ratio associated with the identified best mode $m_i$ between the number of coding units using the best mode $m_i$ and the total number of coding units in the current image, and/or c) a step of updating a second ratio associated with the identified best mode $m_i$ between the number of pixels using the identified best mode $m_i$ and the total number of pixels in the considered image.

In an embodiment may further comprise repeating the steps a) to c) until the last coding unit $CU_{N_{CU}}$.

In an embodiment, a deducing step may comprise, for each coding mode $m_i$ associated with the coding units of a previously encoded image, a comparing step for enabling the coding mode $m_i$ in the $N_m$ possible coding modes for the current image, if the largest value between the first and the second ratio associated with the considered best mode $m_i$ is below a predetermined threshold.

In an embodiment, an image is divisible into coding units, the step of computing the statistics on a current image may comprise for each coding unit $CU_k$ of the current image, $k=1, \ldots, N_{CU}$, k being the index of the coding unit and $N_{CU}$ the total number of coding units in the current image:

e) a step of identifying a best mode $m_i$ for the coding unit $CU_k$ among $N_m$ possible coding modes for the current image, f) a step of calculating a rate distortion penalty $\Delta[m_i,m_j]$ associated with the identified coding mode $m_i$ compared to the other coding modes $m_j$, with $j \neq i$ and $j=1, \ldots, M$, where $\Delta[m_i,m_j]$ is the cumulative cost of the relative cost gains such that:

$$\Delta[m_i,m_j] \Leftarrow \Delta[m_i,m_j] + \delta[m_i,m_j], \text{ and}$$

$$\delta[m_i,m_j] = C_k[m_j] - C_k[m_i]$$

where $\delta[m_i,m_j]$ is the relative cost gain for the mode $m_i$ for the considered coding unit $CU_k$ compared to the mode $m_j$, $C_k[m_i]$ is the a rate-distortion cost for the identified best mode $m_i$ for the coding unit $CU_k$, and $C_k[m_j]$ is the a rate-distortion cost for the coding modes $m_j$ for the coding unit $CU_k$.

In an embodiment, the method may further comprise repeating the steps e) and f) until the last coding unit $CU_{N_{CU}}$.

In an embodiment, the step of analyzing the statistics of the previously encoded images comprising for all the coding modes $m_i$ associated with the coding units of a previously encoded image:

h) a step of identifying the rate-distortion penalty $\Delta[m_i, m_j]$ which is minimal, i) a step of comparing the identified minimal rate-distortion penalty with a given threshold, j) the step of deducing the enabled coding modes comprising disabling the coding mode $m_i$ from the $N_m$ coding modes for the current image if the identified minimal rate-distortion penalty is below the given threshold.

In an embodiment, the method may comprise repeating the steps h) to j) as long as the identified minimal rate-distortion penalty is below the given threshold.

In an embodiment, the dependency set may comprise only one previously encoded image.

In an embodiment, the image or image portion may belong to a layer, preferably the enhancement layer of a scalable video comprising several layers. The method may advantageously be applied to a group of pictures of fixed length.

According to another aspect, there is proposed a method of encoding an image or image portion composed of a plurality of coding units which forms part of an image sequence. The method comprises:

deriving a set of enabled coding modes relative to the encoding of the image or the image portion as mentioned above;

encoding successive coding units, the encoding comprising selecting for each coding unit a coding mode among the set of enabled coding modes; and generating a bitstream of encoded data.

In an embodiment, the set of enabled coding modes may comprise one mode, the one mode being selected for encoding the successive coding units, otherwise the coding mode which is mostly used for the previously encoded images is selected.

In an embodiment, the generated bitstream may include flags for signaling to the image or image portion which coding modes belong to the set of enabled modes.

In an embodiment, the image or image portion may be divided into coding units further organized into groups, the flags being inserted in header data associated with each group for signaling to each group which coding modes belong to the set of enabled modes.

According to another aspect of the invention, there is proposed a method of decoding an image or image portion composed of a plurality of coding units which forms part of an image sequence. The method comprises:

receiving encoded data related to the image or image portion to decode;

deriving a set of enabled coding modes relative to the encoding of the image or the image portion as mentioned above;

decoding the encoded data, using the set of enabled coding modes; and generating the decoded data.

According to another aspect of the invention, there is proposed a method for decoding an image or image portion composed of a plurality of coding units. The method comprises:

receiving encoded data related to the image or image portion to decode and encoded coding mode data defining a set of one or more enabled coding modes for the image or image portion, the set of enabled coding modes being provided according to the method mentioned above;

decoding the encoded data, using the set of enabled coding modes; and generating the decoded data.

In an embodiment, if the set of enabled coding modes comprises one mode, the one mode may be selected for decoding the encoded data, otherwise the coding mode which is mostly used for the previously encoded images may be selected.

According to another aspect of the invention, there is proposed a computer program product for a programmable apparatus, the computer program product comprising a sequence of instructions for implementing a method according to any embodiments mentioned above, when loaded into and executed by the programmable apparatus.

According to another aspect of the invention, there is proposed a computer-readable storage medium storing instructions of a computer program for implementing a method, according to any embodiments mentioned above.

According to another aspect of the invention, there is proposed a device for deriving a set of enabled coding modes relative to the encoding of an image or image portion which forms part of an image sequence, wherein the device is configured to implement a method for deriving a set of enabled coding modes according to any embodiments mentioned above.

According to another aspect of the invention, there is proposed an encoding device for encoding an image or image portion composed of a plurality of coding units which forms part of an image sequence. The device comprises:
- a device for deriving a set of enabled coding modes relative to the encoding of the image or the image portion as mentioned above;
- encoding means for encoding successive coding units, the encoding comprising selecting for each coding unit a coding mode among the set of enabled coding modes; and
- a bitstream generator for generating a bitstream of encoded data.

According to another aspect of the invention, there is proposed a decoding device for decoding an image or image portions composed of a plurality of coding units, which forms part of an image sequence. The device comprises:
- a receiver for receiving encoded data related to the image or image portion;
- a device for deriving a set of enabled coding modes relative to the decoding of the image or the image portion as mentioned above;
- decoding means for decoding the encoded data using the set of enabled decoding modes; and
- a generator for generating the decoded data.

According to another aspect of the invention, there is proposed a decoding device for decoding an image composed of a plurality of coding units, which forms part of an image sequence. The device comprises:
- means for receiving encoded data related to the image or image portion to decode and for receiving encoded data related to coding mode data defining a set of enabled coding modes for the image or image portion, the set of enabled coding modes being provided according to the method as mentioned above;
- means for decoding the encoded data related to coding mode data and for decoding the encoded data related to the image or image portion to decode using said decoded data related to coding mode data; and
- a generator for generating the decoded data.

Embodiments of the invention will now be described, by way of example only, and with reference to the following drawings in which:

FIG. 1 schematically illustrates the inter-layer dependencies in a multi-layer coding framework;

Figure 7:
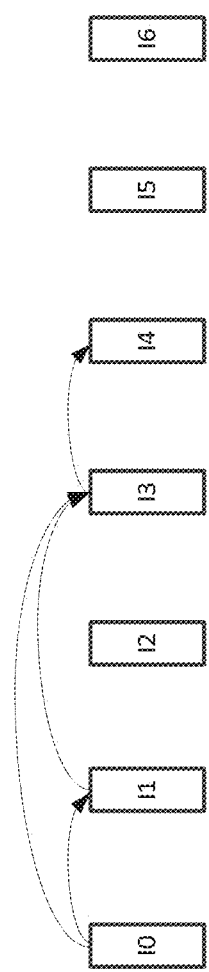
Figure 8:
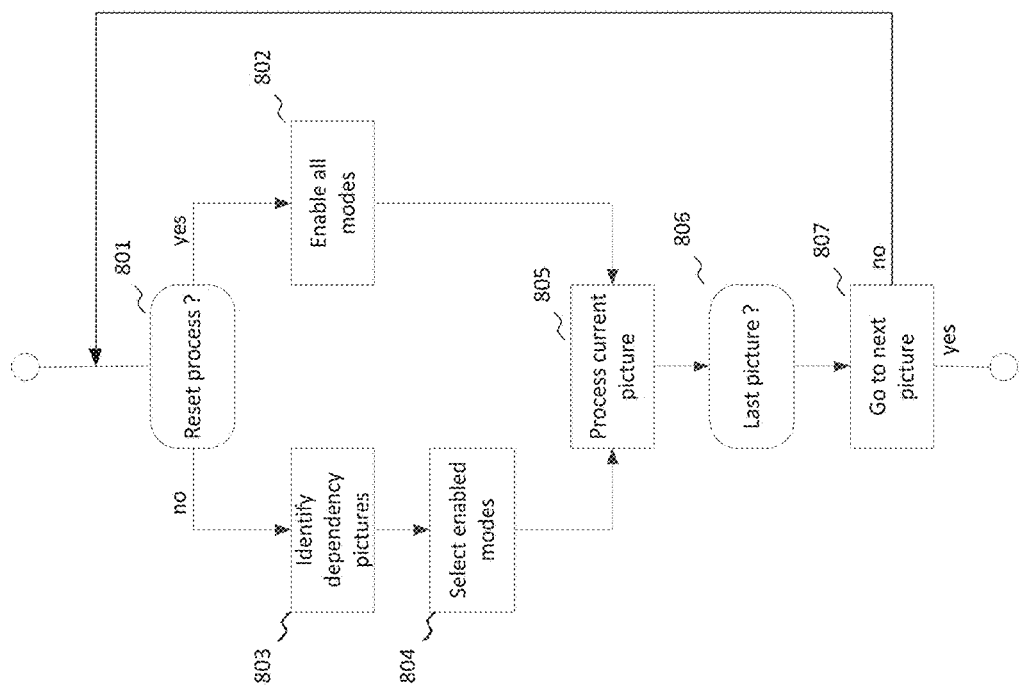
Figure 9:
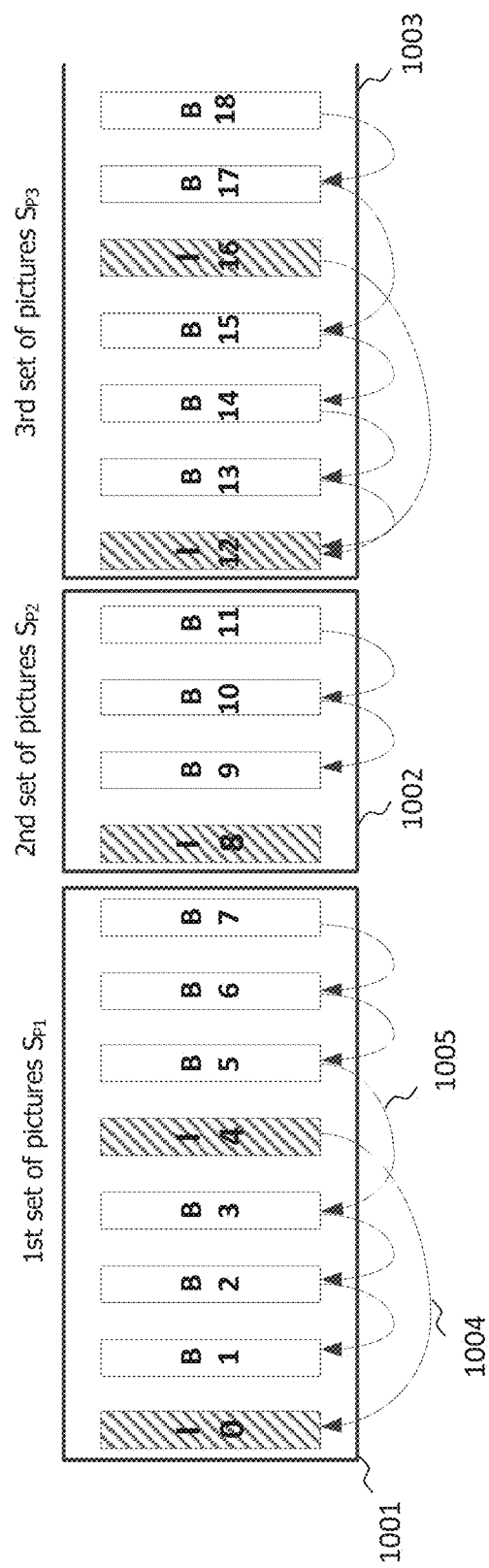

FIG. 7 gives a graphic example of dependencies cascading for the adaptive selection mode process;

FIG. 8 is a flow chart illustrating an example of a simplified synoptic of the adaptive selection mode process;

FIG. 9 illustrates schematically several Group Of Pictures with dependency structure between pictures;

FIGS. 10a, 10b, 10c and 10d respectively illustrate four possible dependency structures in a Group Of Pictures of size 8.

Figure 11:
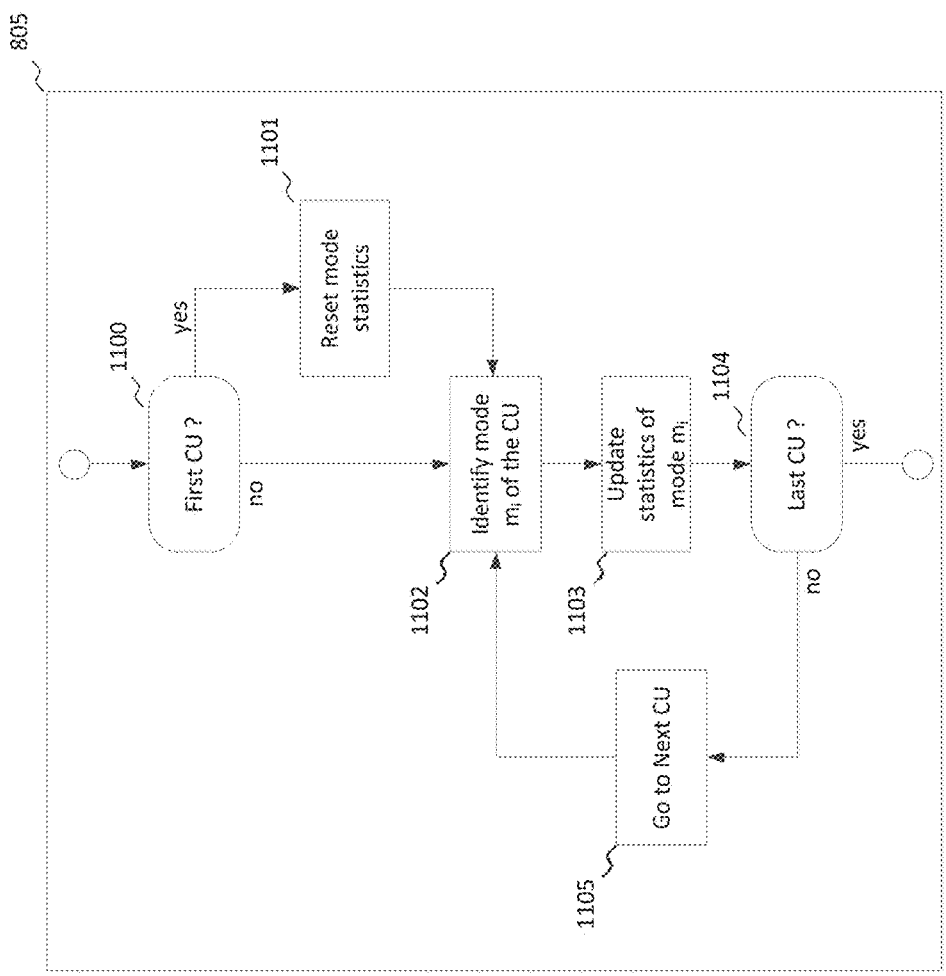
Figure 12:
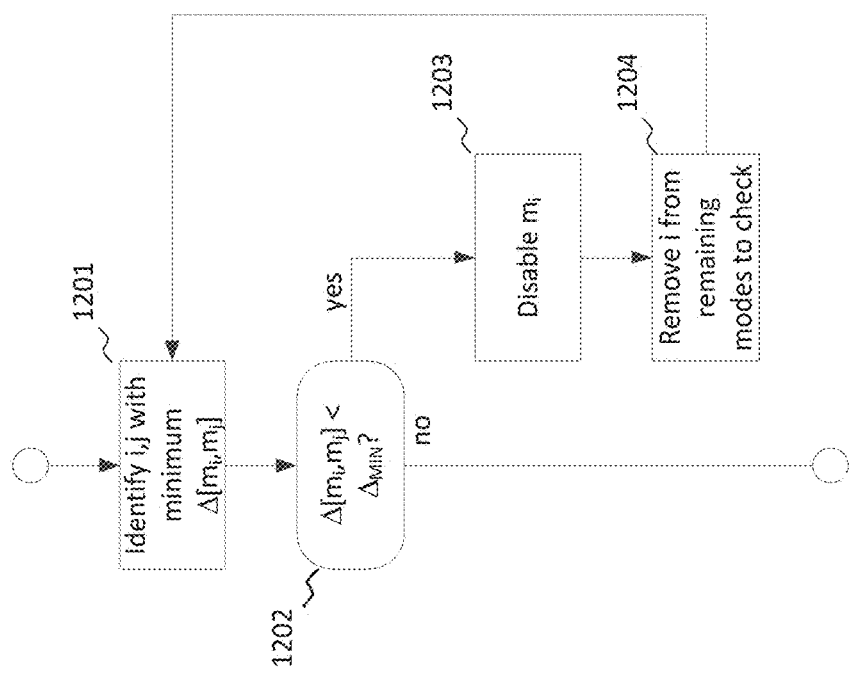
Figure 13A:
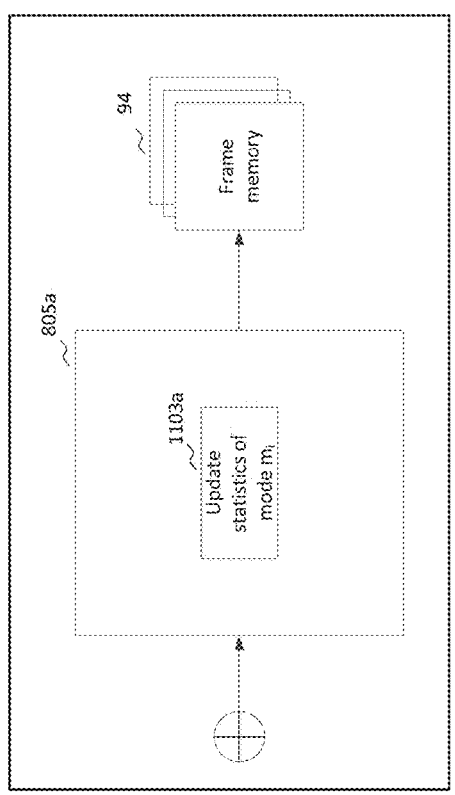
Figure 13B:
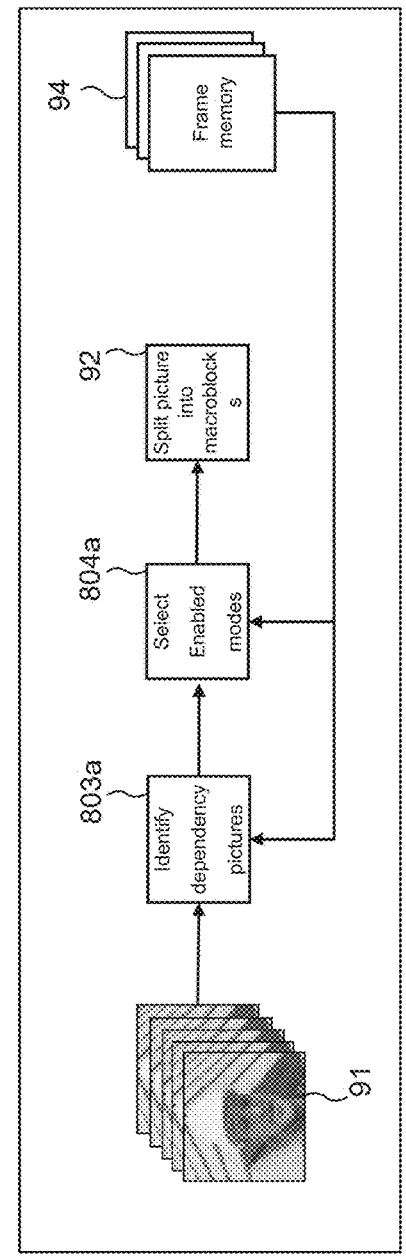
Figure 14A:
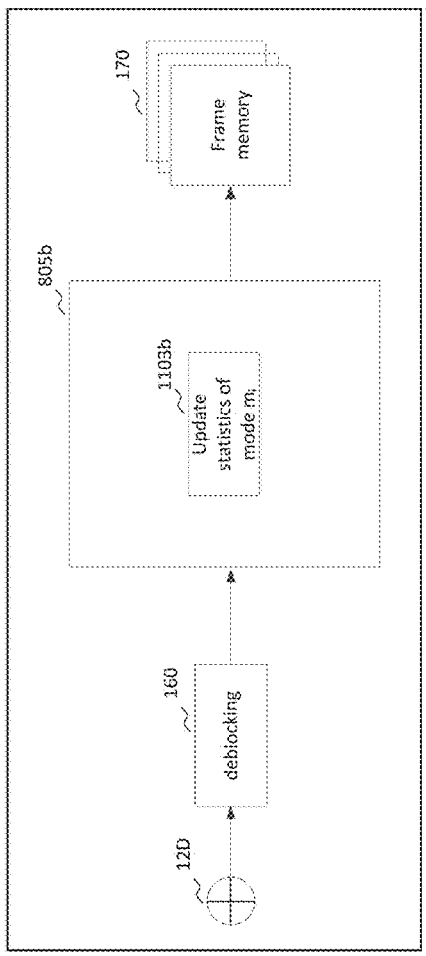
Figure 14B:
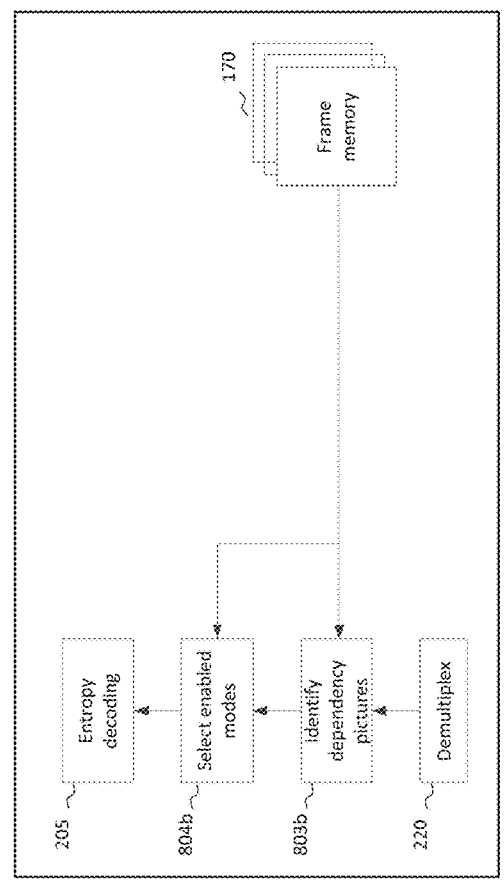

FIG. 11 is a flow chart showing an example of a process of computing statistics in one picture;

FIG. 12 is a flow chart showing an example of a process of selecting the enabled/disabled modes from the statistics of the dependent picture;

FIGS. 13a and 13b are block diagrams illustrating examples of implementation of a device in an encoder according to the present invention; and FIGS. 14a and 14b are block diagrams illustrating examples of implementation of a device in a decoder according to the present invention.

In the following text, the words "picture", "frame" and "image" have the same meaning.

Figure 2:
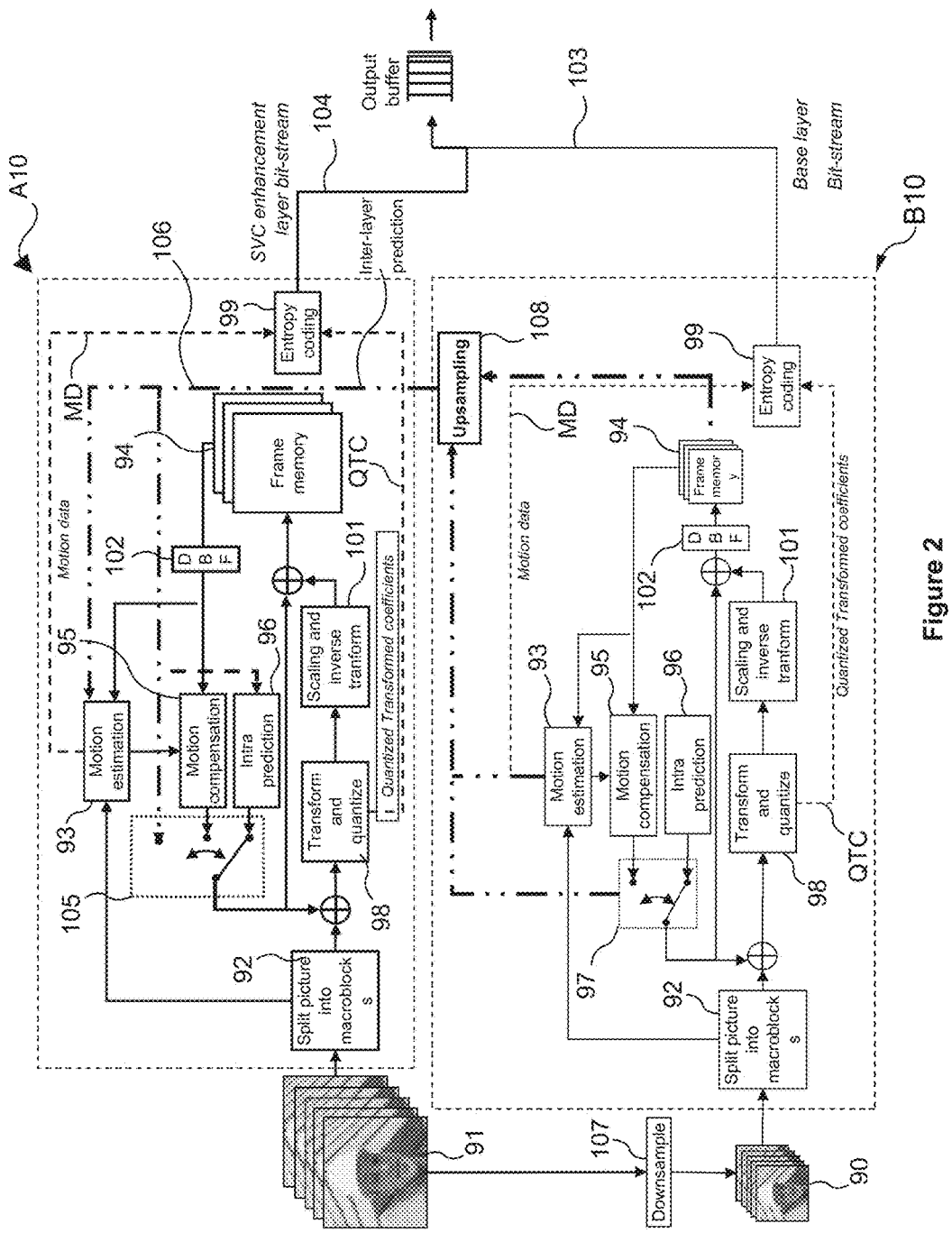
FIG. 2 is a block diagram schematically illustrating the architecture of a multi-layer scalable video encoder.

FIG. 2 illustrates a block diagram of a multi-layer scalable video encoder, configured to implement the invention. This video encoder may comprise a number of subparts or stages, illustrated here are two subparts or stages A10 and B10 producing data respectively corresponding to a base layer 103 and data corresponding to one enhancement layer 104. Each of the subparts A10 and B10 follows the principles of a standard video encoder conforming to the HEVC or H.264/AVC video compression system, with the steps of transformation, quantisation and entropy coding being applied in two separate paths, one corresponding to each layer.

The first stage B10 aims at encoding the base layer of the output scalable stream.

The input to this scalable encoder consists in the original sequence of frame images 90 to compress. The encoder successively performs the following steps to encode a standard video bit-stream. A first picture or frame to be encoded (compressed) is divided into pixel blocks, called coding unit (also referred to hereinafter as CU) in the HEVC standard. The first picture is thus split into blocks or macroblocks 92. Each block first undergoes a motion estimation operation 93, which comprises a search among the reference pictures stored in a dedicated memory buffer 94 for reference blocks that would provide a good prediction of the block.

This motion estimation step provides one or more reference picture indexes which contain the found reference blocks, as well as the corresponding motion vectors. A motion compensation step 95 then applies the estimated motion vectors on the found reference blocks and copies the so-obtained blocks into a temporal prediction picture. Moreover, an Intra prediction step 96 determines the spatial prediction mode that would provide the best performance to predict the current block and encode it in INTRA mode.

Afterwards, a coding mode selection mechanism 97 chooses the coding mode, among the spatial and temporal predictions, which provides the best rate-distortion trade-off in the coding of the current block. The difference between the current block 92 (in its original version) and the so-chosen prediction block (not shown) is calculated. This provides the (temporal or spatial) residual to compress. The residual block then undergoes a transform (DCT) and a quantization 98. Entropy coding 99 of the so-quantized coefficients QTC (and associated motion data MD) is performed. The compressed texture data 103 associated to the coded current block 92 is sent for output.

Finally, the current block is reconstructed by scaling and inverse transform 101. This comprises inverse quantization and inverse transform, followed by a sum between the inverse transformed residual and the prediction block of the current block. Once the current picture is reconstructed and deblocked 102 a deblocking, (denoted as "DBF" for "deblocking filter" in the Figures) is applied, it is stored in a memory buffer 94 (the DPB, Decoded Picture Buffer) so that it is available for use as a reference picture to predict any subsequent pictures to be encoded.

Finally, a last entropy coding step 99 is given the coding mode and, in case of an inter block, the motion data, as well as the quantized DCT coefficients previously calculated. This entropy coder encodes each of these data into their binary form and encapsulates the so-encoded block into a container called NAL unit (Network Abstract Layer). A NAL unit contains all encoded coding units from a given slice. A coded HEVC bit-stream consists in a series of NAL units.

For the spatial enhancement layer, up-sampling 108 operations of the texture and prediction data are performed.

Next, the second stage A10 illustrates the coding of an enhancement layer on top of the base layer. The blocks with the same function as in the stage B10 keep the same references. As a variation, the deblocking filter DBF 102 is connected after the frame memory 94.

The enhancement layer brings a refinement of the spatial resolution to the (down-sampled 107) base layer.

As illustrated in FIG. 2, the coding scheme of this enhancement layer is similar to that of the base layer, except that for each coding unit of a current picture 91 being compressed or coded, additional prediction modes can be chosen by the coding mode selection module 105. This module is designed to implement a step for enabling—or not—coding modes according to the invention, as further described.

These new coding modes correspond to inter-layer prediction 106. Inter-layer prediction 106 consists of re-using the data coded in a layer lower than current refinement or enhancement layer, as prediction data of the current coding unit. The lower layer used is called the reference layer for the inter-layer prediction of the current enhancement layer. In case the reference layer contains a picture that temporally coincides with the current picture, then it is called the base picture of the current picture. The co-located block (at same spatial position) of the current coding unit that has been coded in the reference layer can be used as a reference to predict the current coding unit. More precisely, the prediction data that can be used in the co-located block corresponds to the coding mode, the block partition, the motion data (if present) and the texture data (temporal residual or reconstructed block).

Figure 1:
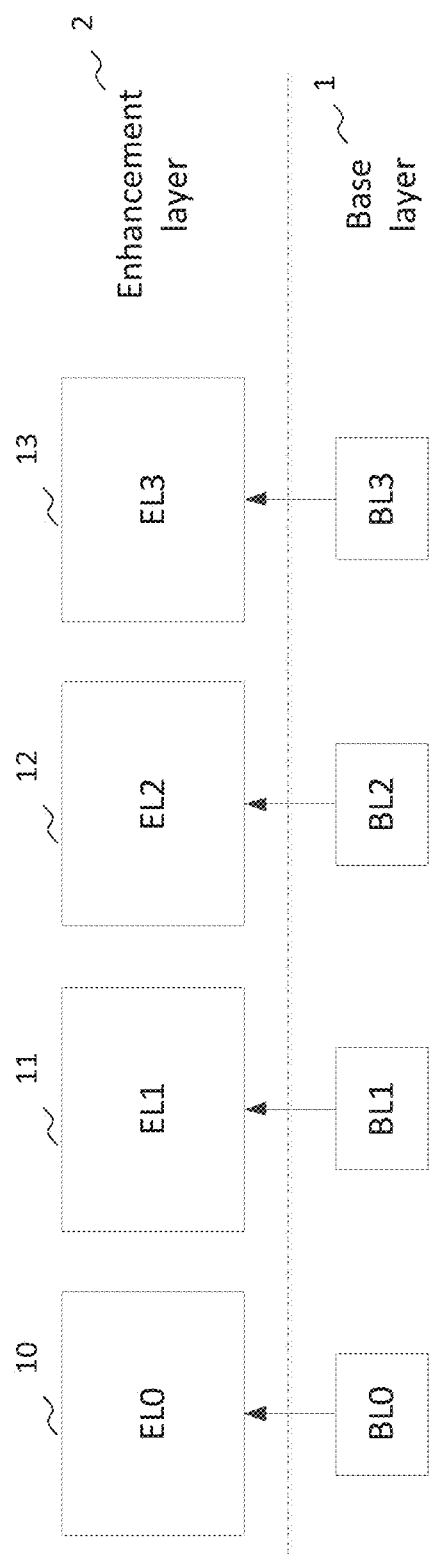
Figure 3:
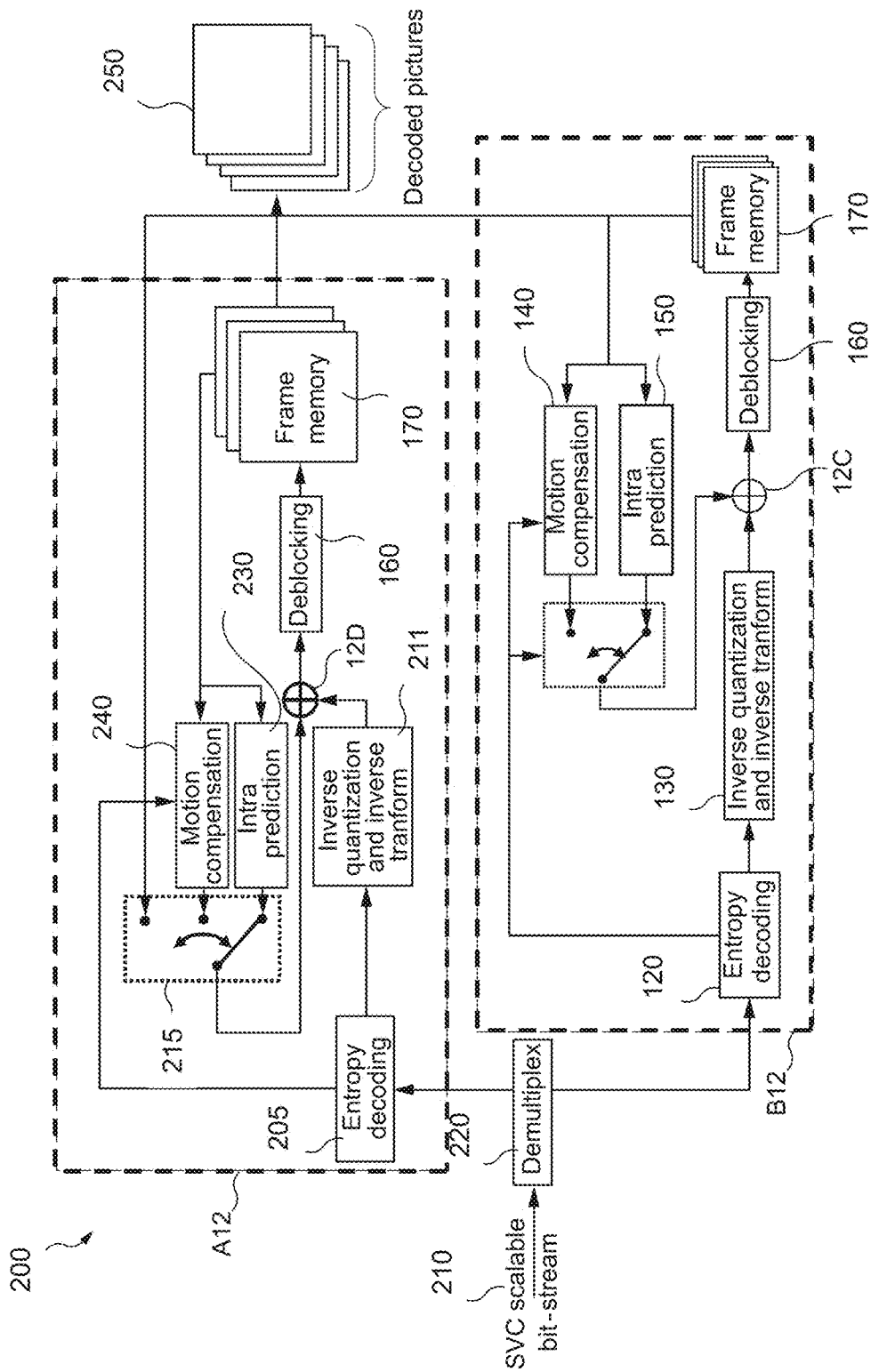
FIG. 3 is a block diagram schematically illustrating the architecture of a multi-layer scalable video decoder.

FIG. 3 presents a block diagram of a scalable decoder 200 which would apply on a scalable bit-stream made of two scalability layers, e.g. comprising a base layer and an enhancement layer. This decoding process is thus the reciprocal processing of the scalable coding process of FIG. 2. The scalable stream being decoded 210, as shown in FIG. 1, is made of one base layer and one spatial enhancement layer on top of the base layer, which are demultiplexed 220 into their respective layers.

The first stage of FIG. 3 concerns the base layer decoding process B12. As previously explained for the non-scalable case, this decoding process starts by entropy decoding 120 each coding unit or block of each coded picture in the base layer. This entropy decoding 120 provides the coding mode, the motion data (reference pictures indexes, motion vectors of INTER coded macroblocks) and residual data. This residual data consists of quantized and transformed DCT coefficients. Next, these quantized DCT coefficients undergo inverse quantization and inverse transform operations 130. Motion compensation 140 or Intra prediction 150 data can be added 12C.

Deblocking 160 is applied. The thus-reconstructed residual data is then stored in the frame buffer 170.

Next, the decoded motion and temporal residual for INTER blocks, and the reconstructed blocks are stored into a frame buffer in the first of the scalable decoder of FIG. 3. Such frames contain the data that can be used as reference data to predict an upper scalability layer.

Then, the second stage of FIG. 3 performs the decoding of a spatial enhancement layer A12 on top of the base layer decoded by the first stage. This spatial enhancement layer decoding involves the entropy decoding of the second layer 205, which provides the coding modes, motion information as well as the transformed and quantized residual information of blocks of the second layer.

Next step consists of predicting blocks in the enhancement picture. The choice 215 between different types of block prediction (INTRA, INTER or inter-layer) depends on the prediction mode obtained from the entropy decoding step 205. This module is designed to implement a step for enabling—or not—coding modes according to the invention, as further described.

Concerning INTRA blocks, such blocks are fully reconstructed in the spatial domain, through inverse quantization, inverse transform to obtain the residual data in the spatial domain, and then INTRA prediction 230 to obtain the fully reconstructed block 250.

Concerning INTER blocks, their reconstruction involves their motion compensated 240 temporal prediction, the residual data decoding and then the addition of their decoded residual information to their temporal predictor. In this INTER block decoding process, inter-layer prediction can be used in two ways. First, the motion vectors associated to the considered block can be decoded in a predictive way, as a refinement of the motion vector of the co-located block in the base picture. Second, the temporal residual can also be inter-layer predicted form the temporal residual of the co-located block in the base layer.

In case of inter-layer predicted block, the result of the entropy decoding 205 undergoes inverse quantization and inverse transform 211, and then is added 12D to data from the co-located block of current block in base picture. These data can be the reconstructed base layer block samples, the residual base layer block samples. These base layer samples are possibly used in their post-filtered and up-sampled (in case of spatial scalability) version.

Note that in an addition scalable coding of a block all the prediction information of the block (e.g. coding mode, motion vector) may also be partly or fully inferred from the co-located block in the base picture. Therefore in the state-of-the-art, several inter-layer coding modes can be used, such as:

inter-layer prediction of texture from base layer samples
inter-layer prediction of motion from base layer motion data
inter-layer prediction of block partitioning from base layer block partitioning
inter-layer prediction of residual from base layer residual
inter-layer prediction of motion and residual from base layer motion and residual As mentioned in the Encoder and Decoder description in the previous section, a classical video codec exploits both spatial and temporal correlation between pixels thanks to Intra and Inter mode. The Intra mode exploits spatial correlation of the pixels in the current frame. The Inter modes exploit temporal correlation between pixels of the current frame and previous encoded/decoded frames.

In the current HEVC design, the Inter prediction can be unidirectional or bi-directional. The uni-direction means that one predictor block is used to predict the current block. This predictor block is defined by a list index, a reference frame index and a motion vector. The list index corresponds to a list of reference frames. We can consider that two lists are used: L0 and L1. A list contains at least one reference frame and a reference can be included in both lists. The motion vector has two components: horizontal and vertical. This corresponds to the spatial displacement in term of pixels between the current block and the temporal predictor block in the reference frame. So, the block predictor for the uni-directional prediction is the block from the reference frame (ref index) of the list, pointed by the motion vector.

For the Bi-directional Inter prediction two block predictors are considered. One for each list (L0 and L1). Consequently, two reference frame indexes are considered as well as two motion vectors. The Inter block predictor for bi-prediction is the average, pixel at pixel, of these two blocks pointed by these two motion vectors.

The motion information dedicated to the Inter block predictor can be defined by the following parameters:
One direction type: uni or bi
One list (uni-direction) or two lists (bi-direction): L0, L1, L0 and L1.
One (uni-direction) or two reference frame indexes (bi-direction): RefL0, RefL1, (RefL0, RefL1).
One (uni-direction) or two (bi-direction) motion vectors: each motion vector has two components (horizontal mvx and vertical mvy).

The type of a picture or slice is the way how it is predicted, for instance according to inter-prediction mode, inter-layer prediction mode or intra-prediction mode.

The bi-directional Inter predictor could be used only for the B slice type. The Inter prediction in B slices can be uni or bi-directional. And for P slices, the Inter prediction is only uni-directional. The invention can be used for P and B slices and for both uni and bi-directional Inter predictions.

The current design of HEVC uses three different Inter modes: the Inter mode, the Merge mode and the Merge Skip mode. The main difference between these modes is the data signaling in the bitstream.

For the Inter, all data are explicitly signaled. It means that the texture residual is coded and inserted in the bitstream (the texture residual is the difference between the current block and the Inter prediction block). For the motion information, all data are coded. So, the direction type is coded (uni or bi-directional). The list index, if needed, is also coded and inserted in the bitstream. The related reference frame indexes are explicitly coded and inserted in the bitstream. And the motion vector value is predicted by the selected motion vector predictor. The motion vector residual for each component is then coded and inserted in the bitstream followed by the predictor index.

For the Merge mode, the texture residual and the predictor index are coded and inserted in the bitstream. No motion vector residual, direction type, list or reference frame index is coded. These motion parameters are derived from the predictor index. So, the predictor is the predictor of all data of the motion information.

Eventually, for the Merge Skip mode no information is transmitted to the decoder side except the "mode" and the predictor index. It is the same processing as the Merge mode except that no texture residual is coded or transmitted. The pixel values of a Merge Skip block are the pixel values of the block predictor.

The pictures from the different layers can be coding using information from previously processed pictures from the same layer or from a lower layer. This creates a temporal coding structure, which indicates the structure of the dependencies between pictures for their coding or decoding.

Two main structures are generally considered in video coding:
Low delay temporal structure;
Random Access temporal structure.

These are the two coding structure considered in the common test conditions in the HEVC standardization process.

Figure 4:
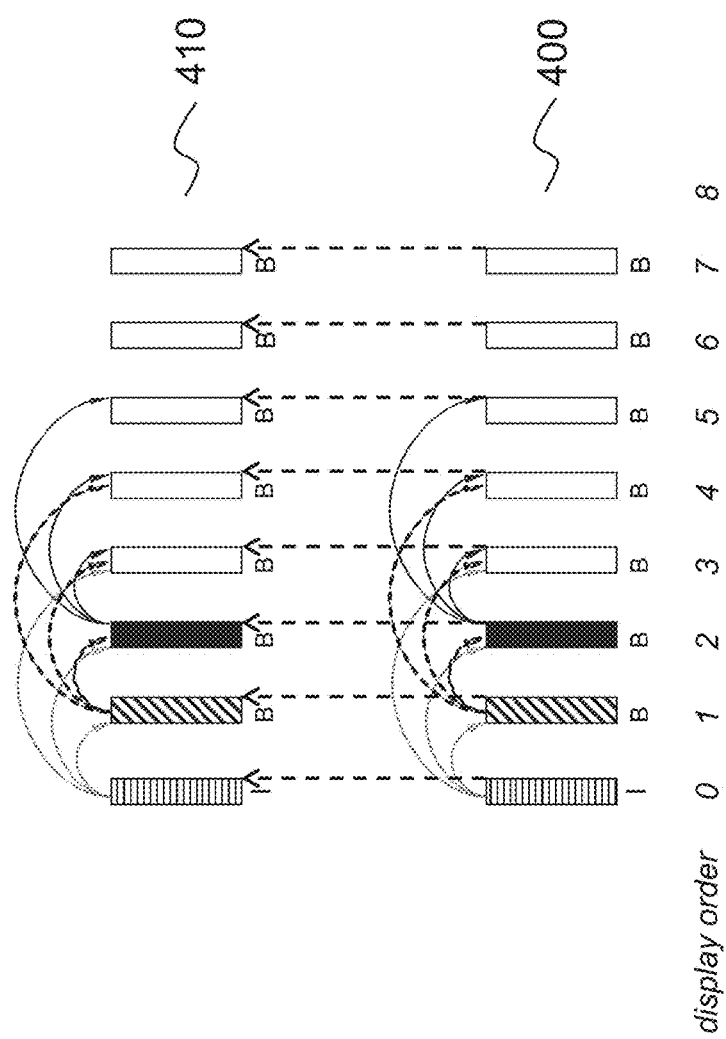
FIG. 4 illustrates graphically an example of a low delay temporal coding structure.

FIG. 4 illustrates the video sequence structure in case of INTER coding in low delay configuration. In this configuration, a picture is predicted from several already coded pictures from the past in the display order. Therefore, as represented by the solid line arrows, only forward temporal prediction is allowed (only from past pictures), which ensures the low delay property. The low delay property means that on the decoder side, the decoder is able to display a decoded picture straight away once this picture is in decoded state.

In addition to temporal prediction, inter-layer prediction between the base 400 and enhancement layer 410 is also illustrated on FIG. 4 via the dashed line arrows. Indeed, the scalable video coding of the enhancement layer 410 aims at exploiting the redundancy that exists between the coded base layer and the enhancement layer, in order to provide good coding efficiency in the enhancement layer.

As a consequence, it can be seen that several prediction modes can be employed in the coding of enhancement pictures.

Figure 5:
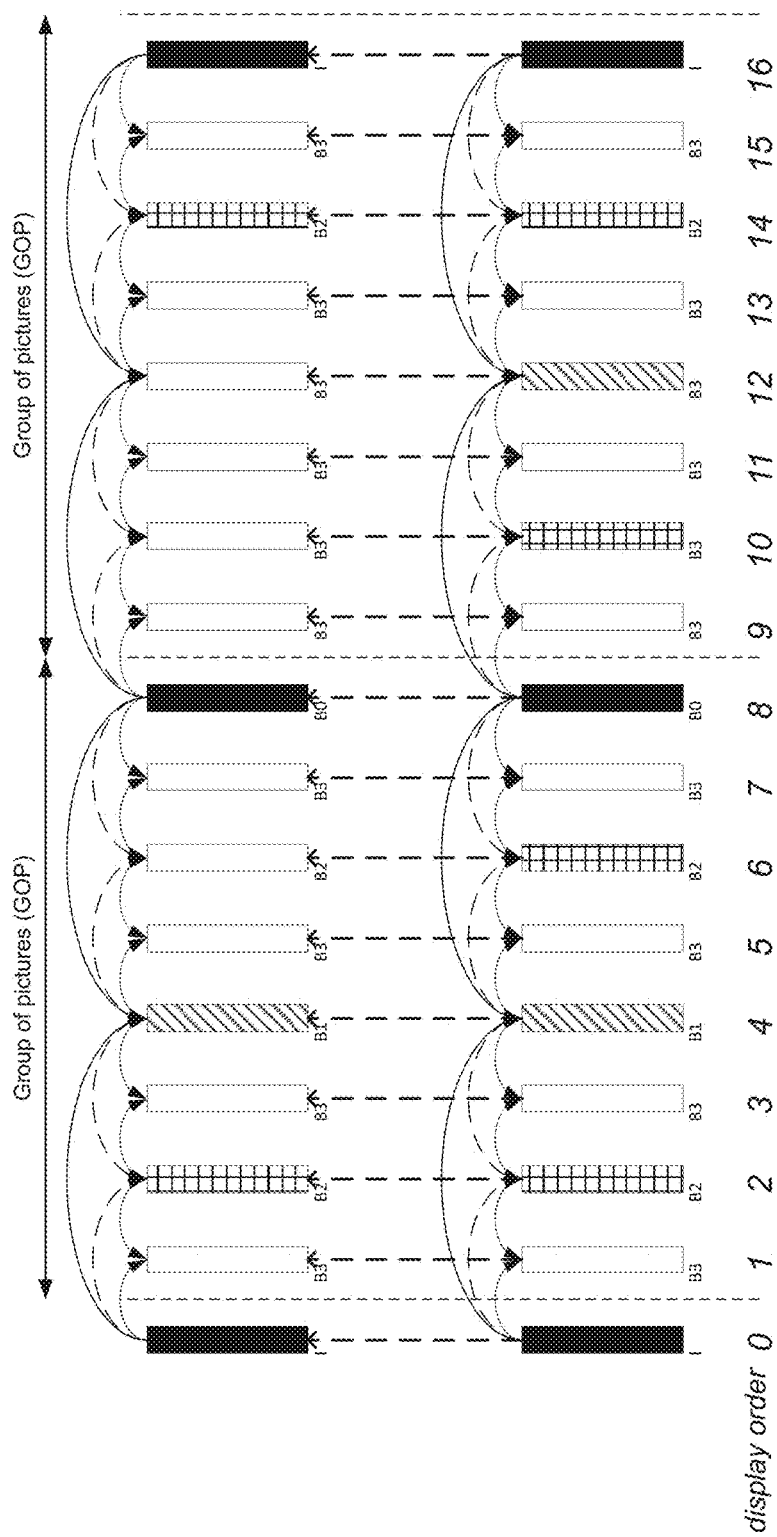
FIG. 5 illustrates graphically the random access temporal coding structure.

FIG. 5 illustrates the random access temporal coding structure. In this structure the sequence is divided into successive Groups Of Pictures (GOP). Two GOPs are represented in FIG. 5.

The random access property means that several access points are enabled in the compressed video stream, i.e. the decoder can start decoding the sequence at some pictures different from the first picture in the sequence. This takes the form of periodic INTRA picture (I pictures) coding in the stream as illustrated by FIG. 5.

In addition to INTRA pictures, the random access coding structure implies the use of both forward and backward predictions, as symbolized by the solid line arrows, and of B picture. The random access configuration also provides temporal scalability features, which takes the form of the hierarchical B pictures organization of FIG. 5.

Finally, as for the low delay coding structure, additional prediction tools, symbolized by dashed arrows, are used in the coding of enhancement pictures: inter-layer prediction tools.

Figure 6A:
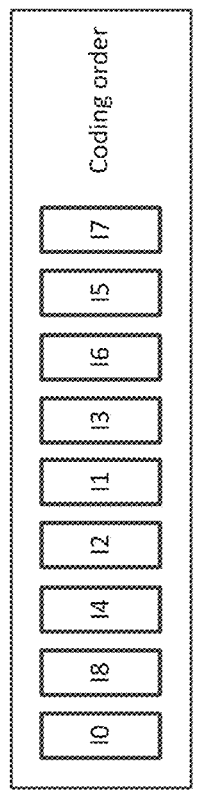
FIGS. 6a and 6b illustrate schematically the picture hierarchy in a random access temporal coding structure.
Figure 6B:
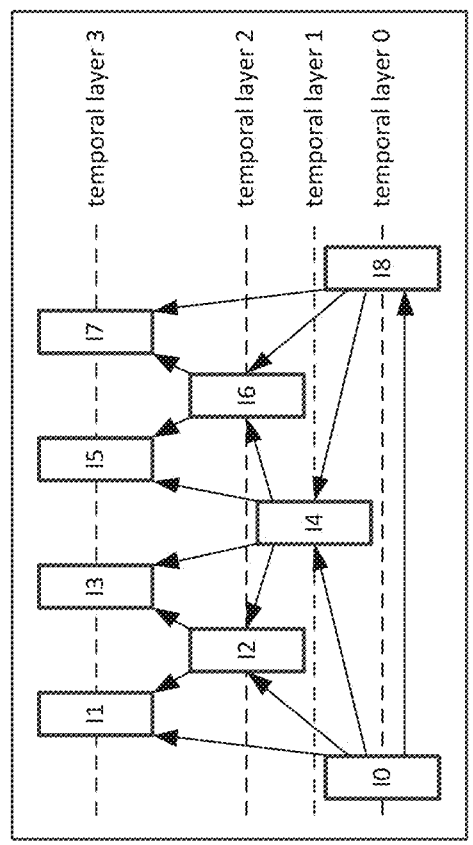

This temporal coding structure actually corresponds to a hierarchy between the coded pictures, which can be organized in so-called temporal layers, as shown in the FIGS. 6a and 6b. In this case there is one single spatial layer represented in FIG. 6b, and four temporal layers, corresponding to four accessible frame rates.

In FIG. 6b, the GOP structure is illustrated, with the hierarchical dependencies between the pictures, symbolized by the solid line arrows. In FIG. 6a, the order of coding is shown. It can be seen that the pictures are not coded according to their picture number but according to their hierarchical dependency.

It can be also observed that temporal layer 0 corresponds to ⅛th of the video frame rate, since this layer contains one frame over eight of the video sequence (frames I0, I8, a future I16 . . . and so on). Temporal layers 0 and 1 correspond to ¼th of the video frame rate, since this layer contains one frame over four of the video sequence (frames I0, I4, I8, and future I12, I16 . . . and so on). Temporal layers 0, 1 and 2 correspond to ½th of the video frame rate since this layer contains one frame over two of the video sequence (frames I0, I2, I4, I6, I8, and future I10, I12, I14, I16 . . . and so on). Temporal layers 0, 1, 2 and 3 correspond to the full video frame rate.

Finally it should be mentioned that in general a hierarchy of quantization parameters also mentioned as QPs, is associated with the hierarchy of pictures: the QPs of higher temporal layers are in general higher than the QPs of lower temporal layers. The QPs are the parameters involved by the blocks 98, 211 and 130 in FIGS. 2 and 3. The QP can be an initial $QP_{init}$ signaled in the header of the picture, that can be further vary inside the picture.

Subsequently, the group of coding entities consists of a picture (also called image). The invention can be easily generalized to other types of groups of coding entities, such as a slice, a tile (rectangular region inside a picture), a region, a set of pictures. In the text below, the following concepts are also used:

Current picture: picture to be processed (encoded or decoded, depending if we are at the encoding or decoding side).

Dependency picture: picture processed before the current picture, for which statistics are computed to decide the enabling/disabling of coding modes for the current picture, also called previously encoded image. It should be noted that the dependency as defined in the invention is not the same as the temporal dependency. The dependency pictures are not necessarily the same as the reference pictures that are used for the temporal prediction of the current picture.

Picture characteristics: coding parameters like: quantization parameter (QP), temporal level, lagrangian parameter, picture or slice type, etc. In particular, the picture characteristics are used to identify the dependency pictures of the current picture.

Picture statistics: Statistics measured on a picture, related to the coding modes used for this picture.

When processing the pictures of the video sequence, picture statistics are evaluated related to the usage of the different coding modes. The major steps of the invention are summarised below.

We consider now a current picture which is going to be processed. Firstly, one or several dependency pictures previously processed are selected if they have the same or close picture characteristics as the considered current picture. The coding modes which are enabled or not for the current picture are then decided based on the analysis of the statistics from the dependency pictures. Finally, the current picture is processed. Its statistics are computed and this current picture can then become, later in the full coding or decoding process, a dependency picture for next pictures to be processed.

Now the invention will be described more in detail. The following description can apply both at the encoder and decoder side.

FIG. 7 represents an example of dependencies between successive pictures, according to the invention. As depicted by the solid line arrows, the picture I3 uses as dependency pictures the picture I0 and the picture I1. Then picture I4 uses the picture I3 as dependency picture.

By considering these dependencies, the invention proposes to enable or disable one or several coding modes for the considered image.

It is considered that there are $N_m$ possible coding modes $m_1, \ldots, m_{Nm}$ for the considered image. Based on the statistics of dependency pictures I0 and I1, some modes are disabled for processing picture I3. It is supposed that only modes $m_1, \ldots, m_K$, $K<N_m$, are enabled for picture I3. When the coding or the decoding of the picture I4 starts, statistics of picture I3 are analyzed, and some enabled modes of picture I3 are possibly disabled for picture I4. So the number of L modes for picture I4 is necessarily lower than or equal to K.

Because of this phenomenon, a regular reset is preferably required, in order to re-enable all the modes. For example, this can be done periodically in the video sequence, typically for each starting of a GOP. It can also be systematically applied at each intra picture, or also at each so-called instantaneous decoding refresh (IDR) picture.

FIG. 8 provides an embodiment of a general block diagram of the process for adaptive selection of coding modes, according to the invention. The method described in this figure and the following description can be implemented both at the encoder or the decoder side, except if the contrary is mentioned.

First it is checked in step 801 if a reset of the process is required or not. If the reset is required, all coding modes are enabled, step 802. Otherwise, a set of dependency including dependency pictures of the current picture are identified in step 803. Then, based on the statistics of these set of dependency pictures, the enabled modes are selected for the current picture in step 804.

As a variation, another embodiment (not illustrated) can skip the step 803. The enabled modes which are selected for the current picture can be based on the statistics computed on previously encoded pictures whose dependencies have not been identified. For instance, the previously encoded pictures can be those which belong to the same GOP as the current picture.

Then for the embodiment represented in FIG. 8, the current picture is processed in step 805. In this process, the picture is coded (e.g. if we are at the encoder side) or decoded (e.g. if we are at the decoder side) and statistics related to the usage of the modes are computed for the current picture. Preferably, the process comprises the storage of the statistics in a memory buffer. In another embodiment (not represented), the statistics can be computed each time that a dependency picture is identified for a current picture.

Back to the embodiment in FIG. 8, if the end of the sequence is not reached, which is indicated by the test of step 806, the process moves to the next picture, step 807. This next picture becomes the new current picture. Then the process comes back to step 801. Otherwise, the process stops if the end of the sequence is reached.

Now, the step for identifying the dependency pictures, step 803 in FIG. 8 is going to be described more in detail. The identification of the dependency pictures of the current picture is based on the analysis of the pictures coding characteristics. A dependency picture must have characteristics close to the coding characteristics of the current picture.

For example, the following characteristics may be used:
temporal stamp TS, or instant, or frame number in the display order;
temporal coding stamp, or frame number in the coding order;
temporal layer TL (for instance in a random access temporal coding structure), as shown in FIG. 6;
the quantization parameters, QPs;
the Lagrangian parameter LP, used for controlling the balance between the coding cost and the distortion ion the encoding process; and
the slice or picture type PT (e.g. the characterization of the prediction modes used for the slice or picture, like the intra-slice, the mono-pred slice or bi-pred slice).

In a first embodiment of the invention, at most one picture is identified as a dependency picture for the current picture, based on its temporal stamp TS and its temporal layer TL. The following algorithm applies to select the dependency picture. A reset period P is defined. It is preferably set to the size of the GOP $S_{GOP}$. It can be alternatively set to $n \cdot S_{GOP}$ with n being an integer value. The period P can also correspond to the Intra picture or IDR picture period. The period can be a fixed value or a varying value (for instance if it corresponds to the GOP size and that the encoder modified on-the-fly this GOP size).

At each period P, the reset process applies, resulting in enabling all the modes for the current picture. The pictures inside a period form a set of pictures $S_P$.

The period P can change along the video sequence, for instance because of a scene cut. Therefore the size of the set of pictures $S_P$ may vary from one set to the next one, as illustrated in FIG. 9.

In this illustration, three successive sets $S_{P1}$ 1001, $S_{P2}$ 1002 and $S_{P3}$ 1003 are shown, with variable sizes. It is also shown that an intra-picture (I) may depend on a previous intra picture of the same set (e.g. the arrow 1004). Also, a "B" picture (B) may depend on one B picture of the same set, these two B pictures being nevertheless separated by one intra picture (e.g. the arrow 1005).

According to one embodiment, the dependency picture of a current picture is the closest previously coded picture which:

belongs to the same set of picture $S_P$ as the current picture, $S_P$ being defined above, has the same type as the current picture, and belongs to the same temporal layer if such a previously coded picture exists or from the immediate lower temporal layer.

If no dependency picture is found, the reset process applies and all modes are enabled for the current picture, as done in step 802 in FIG. 8.

As an example, in the case of the temporal structure as depicted in the FIG. 6b, the following dependencies as defined by the invention are built:

the picture 4 depends on the picture 8 (or in other words, the picture 8 belongs to the set of dependency relative to the picture 4), the picture 2 depends on the picture 4, the picture 1 depends on the picture 2, the picture 3 depends on the picture 1, the picture 6 depends on the picture 2, the picture 5 depends on the picture 3, and the picture 7 depends on the picture 5.

Regarding the picture type, the criterion can be less strict. For instance, pictures of different type as the current picture can be anyway considered if this involves same coding modes. For example, if the current picture is of type P (which is an Inter-picture using temporal motion compensation), pictures of type B, also using temporal motion compensation, can be accepted in the set of dependency pictures of the current picture.

Figure 10C:
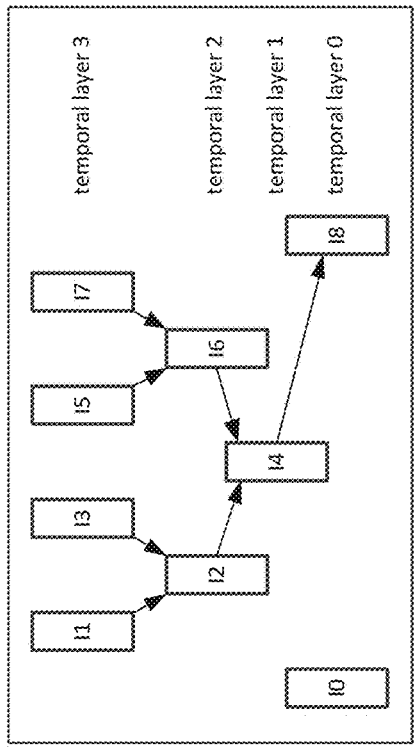
Figure 10D:
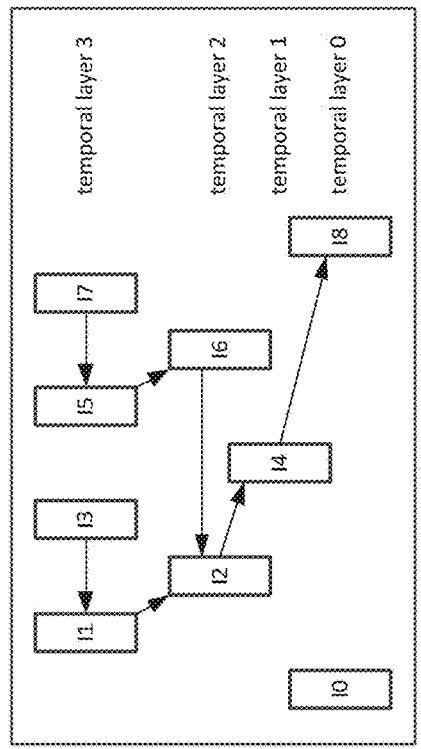
Figure 10A:
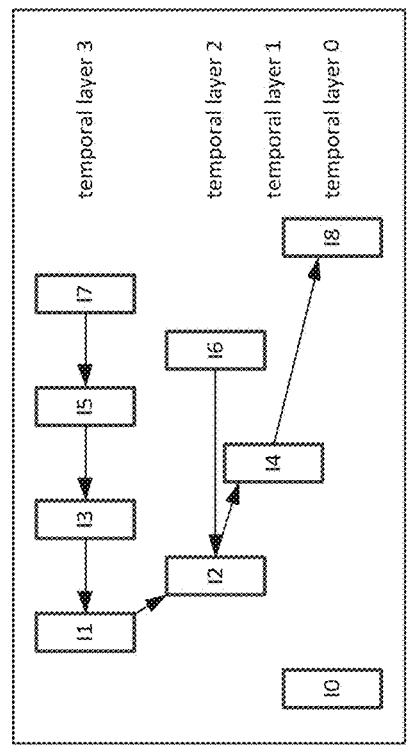

This dependency structure is illustrated in FIG. 10a in a GOP of size 8. In this example, the value of the GOP's size $S_P$ is set to 8. It is noticed is that the pictures I1, I2 and I4 depend from pictures of a lower temporal layer, while pictures I3, I5, I6 and I7 depend from pictures of the same temporal layer.

According to an embodiment, it is possible to avoid to store the statistics for each picture, but rather to store the statistics for each temporal layer. This has been beneficial since the required memory is reduced. When a picture of a given temporal layer TL is coded, its statistics replace or update the statistics of the temporal layer TL, stored in the statistics buffer stats_layer[TL]. The mode selection for a current picture is made from statistics of the temporal layer TL_prev, stats_layer[TL_prev], where TL_prev is chosen as follows. Let TL_curr be the temporal layer of the current picture, PN_curr be its picture number (in display order), Gop_Size the size of the group of pictures which the current picture belongs to, and NB_TL the number of temporal layers of the GOP (there are a maximum of NB_TL statistics buffer stats_layer[TL], with TL=0 . . . NB_TL-1). TL_prev is determined as follows:

If ((PN_curr % Gop_Size)$-2^{NB\_TL-TL\_curr}$)<0

TL_prev=TL_curr-1

Else

TL_prev=TL_curr where % is the modulo operator.

This algorithm is equivalent to the algorithm illustrated in the FIG. 10a mentioned above. In the FIG. 10a, Gop_Size is equal to 8. There are 4 temporal layers: NB_TL=4. Let's consider that images I0 and I8 have already been processed. Since they are both in temporal layer 0, they have been used to update stats_layer[0].

When the image I4 (PN_curr=4) from temporal layer 1 (TL_curr=1) is processed, since ((PN_curr % Gop_Size)$-2^{NB\_TL-TL\_curr}$)=-4<0, TL_prev=TL_curr-1=0. So stats_layer[0] is used to select the modes of the picture I4. Then the processing of image I4 has comprised updating the statistics buffer stats_layer[1], since the image I4 has its TL equal to 1.

Then it is moved to the image I2 (PN_curr=2) from temporal layer 1 (TL_curr=2). ((PN_curr % Gop_Size)$-2^{NB\_TL-TL\_curr}$)=-2<0. So, it comes TL_prev=TL_curr-1=1. Consequently, the statistics buffer stats_layer[1] is used to select the modes of picture I2. Then the processing of image I2 has comprised the statistics buffer stats_layer[2] since the image I2 has its TL equal to 2.

Then it is moved to the image I6 (PN_curr=6), again from temporal layer 1 (TL_curr=2). ((PN_curr % Gop_Size)$-2^{NB\_TL-TL\_curr}$)=2>=0, so TL_prev=TL_curr=2. Consequently the statistics buffer stats_layer[2] is used to select the modes of picture I2. Then the processing of the image I6 has updated the statistics buffer stats_layer[2] since the image I6 has its TL equal to 2. And the process continues similarly for the next pictures of the GOP.

According to another embodiment, instead of using the temporal layer, the QP is used. It is supposed that there is only one dependency picture for the current picture. The criteria to select the dependency picture are the following. The dependency picture of a current picture is the closest previously coded picture which:

belongs to the same set of picture $S_P$ as the current picture, $S_P$ being defined above, has the same type as the current picture, and has the same QP as the current picture, if such a picture exists or has the closest lower QP as the current picture, among the pictures of the same $S_P$.

Preferably, the QP is the initial $QP_{init}$ specified in the picture (or slice) header. In case of varying QP inside the picture, it can also be defined as the average QP over the picture or as the most frequent QP value used over the picture.

As a variation, the Lagrangian parameter LP can be used instead of the temporal layer or the QPs.

In another embodiment, it is considered that all modes are enabled for pictures of the two lowest temporal layers. The selection of modes based on dependency pictures is only made for the other temporal layers. In this case, the following may apply. The dependency picture (if only one dependency picture is considered) of a current picture is the closest previously coded picture which:
belongs to the same set of picture $S_P$ as the current picture, $S_P$ being defined above,
has the same type as the current picture, and
belongs to the same temporal layer.

If no dependency picture is found, the reset process applies and all modes are enabled for the current picture, according to the step 802 in FIG. 8.

As an example, in the case of the temporal structure depicted in the FIG. 6*b*, the following dependencies are built:
the picture I3 depends on the picture I1,
the picture I5 depends on the picture I3,
the picture I7 depends on the picture I5, and
the picture I6 depends on the picture I2.

Figure 10B:
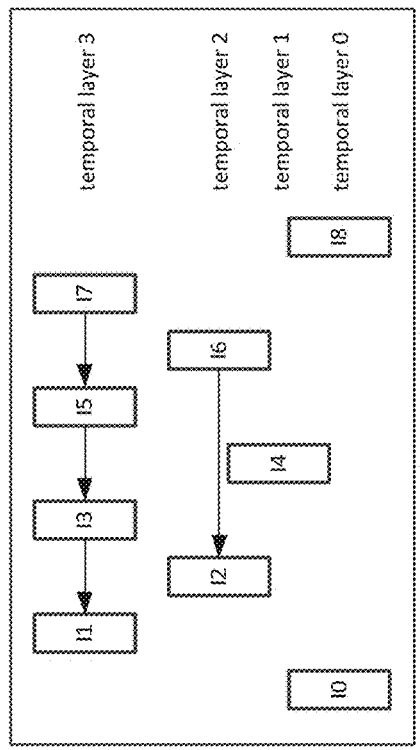

This dependency structure is also shown in FIG. 10*b* in a GOP of size 8. In this example, $S_p$ is set to 8. It should be noticed that there is no inter-temporal layers dependency.

In another embodiment, where it is also considered that all modes are enabled for pictures of the two lowest temporal layers, the selection of modes based on dependency pictures is only made for the other temporal layers. In this other embodiment, the following may apply. The dependency picture (if only one dependency picture is considered) of a current picture is the closest previously coded picture which:
belongs to the same set of picture $S_P$ as the current picture, $S_P$ being defined above,
has the same type as the current picture, and
has the same QP.

As a variation, instead of using the temporal layer or the QP, the Lagrangian parameter LP can be used.

In another embodiment, the dependency pictures of a current picture is the closest previously coded picture which:
belongs to the same set of picture $S_P$ as the current picture, $S_P$ being defined above,
has the same type as the current picture, and
belongs to the immediate lower temporal layer with the closest temporal stamp as the current picture.
This case is illustrated in FIG. 10*c*.

In another embodiment, the dependency pictures of a current picture is the closest previously coded picture which:
belongs to the same set of picture $S_P$ as the current picture, $S_P$ being defined above, and
has the same type as the current picture.
This case is illustrated in FIG. 10*d*.

In another embodiment, the pictures belonging to the set of dependency of a picture may be determined by using a distance function between well-chosen characteristics in a previously encoded picture relatively to the current picture.

A vector of characteristics $VC=[VC_0, \ldots, VC_N]^T$ is built for the both pictures, where T is the transposition operator. Each $VC_i$ corresponds to a specific characteristic such as those mentioned above (QPs, temporal stamps . . . ). A distance function $D(VC^{curr}, VC)$ is used to measure the similarity between the vector of characteristics $VC^{curr}$ from the current picture and the vector of characteristics VC from the previously coded picture being checked to be a dependency picture.

The pictures such that this distance is below a given threshold $\lambda$ are selected as dependency pictures. In addition, the number of dependency pictures can be limited to a given number X, and up to X pictures having the lowest distance below a given threshold $\lambda$ are selected.

In an embodiment, the distance function is defined as:

$$D(VC^{curr}, VC) = w_0 \cdot d(VC_0^{curr}, VC_0) + \ldots + w_i \cdot d(VC_i^{curr}, VC_i) + w_N \cdot d(VC_N^{curr}, VC_N)$$

where
$w_i$ are weighting factors related to each characteristic, aiming at giving more or less importance to the different characteristics. For instance, the Temporal stamp TS and the Quantization Parameter QP should have a weight more important than other parameters such as the picture type, because when they are similar for two pictures, these two pictures have many chances to have similar coding properties.

$d(a,b)$ is a distance between parameters a and b, for instance the square difference $(a-b)^2$ or the absolute difference $|a-b|$.

Once the set of dependency has been identified according to one embodiment described above, the enabled modes are selected for the current picture, based on statistics computed on the dependency pictures.

Before describing the selection of the enabled modes based on statistics computed on the current image's dependency pictures, step 804 in FIG. 8, the ways to compute the statistics on an image will be detailed. It is reminded that those statistics are computed for each current image, and then stored for being used when this image will be itself a dependency picture, step 805 in FIG. 8.

First, statistics relative to each dependency picture have been stored when this dependency picture was processed. The way to compute these statistics will be explained more in detail below, based on the FIG. 11. Those statistics relative to the mode of dependency pictures may be stored for each picture. As a variation, they can be stored for each temporal layer. When the picture of a given temporal layer TL is coded, its statistics are stored in the statistics buffer of this temporal layer.

The computed statistics are gathered for each coding mode or for each set of coding modes if some coding modes are grouped into subsets. For example, the inter-layer prediction modes Intra BL and Base Mode can be grouped into one single subset 'inter layer'.

FIG. 11 details the step 805 of FIG. 8. This step comprises the processing of the current picture in order to encode or decode it. This step includes the computing of the statistics related to the current picture and the storing of theses computed statistics for being used for the next pictures. The storing step is not illustrated here to simplify the figure. Indeed, the statistics are potentially useful if a next picture to be processed will use as dependency picture the current picture being processed, as reminded above.

The picture is processed coding unit by coding unit (also called "CU"). If this is the first CU to be processed, step 1100, the picture's statistics for all the enabled modes of the picture are reset, step 1101. In other words, the statistics concerning modes that are not enabled are reset by default.

Then a mode $m_i$ of the CU is identified in step 802. At the encoder, this consists of choosing, among the enabled modes of the current picture, the best coding mode $m_i$ for the CU, according to a method well known by the man skilled in the art. For instance, this best coding mode $m_i$ may be selected, based on the rate-distortion cost. At the decoder, this only consists in decoding the coding mode applied to the CU.

Then each time a mode $m_i$ is a best mode for a coding unit, the statistics for this mode $m_i$ are updated in step 1103. The updating can be done according to several embodiments described more in detail below. It is then checked if the last CU is reached, step 1104. If it is so, the process is finished. If not, the process goes to the next CU and loop back to the step 1102.

Finally, when the last CU is processed, statistics about each best mode $m_i$ are up-to-date for the current image.

According to one embodiment, the resetting step 1101 may consist of setting all the statistics to zero. Another option is to set the statistics based on the values of the statistics from the dependency pictures. This enables to keep the memory of preceding pictures used as dependency pictures.

Various embodiments may be implemented for the updating step 1103.

According to a preferred embodiment, the step for computing the statistics on a current image comprising for each coding unit $CU_k$ of the current image, $k=1, \ldots, N_{CU}$, k being the index of the coding unit and $N_{CU}$ the total number of coding units in the current image:
 a) a step for identifying 1102 a best mode $m_i$ of the considered coding unit $CU_k$ among $N_m$ possible coding modes for the current image,
 b) a step for updating 1103 a first ratio associated to the identified best mode $m_i$ between the number of coding units using the best mode $m_i$ and the total number of coding units in the current image, and/or
 c) another step for updating 1103 a second ratio associated to the identified best mode $m_i$ between the number of pixels using the identified best mode $m_i$ and the total number of pixels in the considered image.

The steps a) to c) are repeated until the last coding unit $CU_{N_{CU}}$ 1104.

In other words, the two ratios ratioCUs[m] and ratioPixels[m] relative to a given best mode $m_i$ are updated coding unit per coding unit, each time the mode $m_i$ has been identified as being the best mode for the considered coding unit. This is done for each one of the $N_m$ possible coding modes.

The ratio ratioCUs[m] is the ratio between the number of CUs using this mode and the total number of CUs.

The ratio ratioPixels[m] is the ratio between the number of pixels using this mode and the total number of pixels (that is, the picture size in pixels).

Now, we referred back to the FIG. 8, more particularly to the selecting step 804. It is considered that the stored statistics are those computed as mentioned in the previous paragraph. In this case, the mode $m_i$ is enabled or disabled from the $N_m$ possible coding modes of a current image according to the following process.

If $\text{Max}(\text{ratioCUs}[m_i], \text{ratioPixels}[m_i]) < Th$, the mode $m_i$ is disabled, Else the mode $m_i$ is enabled.

Th is a pre-defined threshold. In a preferred embodiment, Th is set to 1% (0.01).

The number of possible coding modes for the current image is then set to $N_m \Leftarrow N_m - (\text{disabled } (m_i))$.

If the final value $N_m$ is bigger than one, it is possible to reduce it by keeping only the enabled mode $m_i$ which is also mostly used in the set of dependency.

According to another embodiment, the statistics relate to the rate-distortion cost of each mode. In other words, the updating step 1103 comprising the updating of cumulative cost gains $\Delta[m_i, m_j]$.

For each best mode $m_i$, the cumulated difference is updated each time that it is identified as a best mode for a coding unit. It is updated according to the following equation:

$$\Delta[m_i, m_j] \Leftarrow \Delta[m_i, m_j] + \delta[m_i, m_j]\ j=1 \ldots N,\ j \neq i$$

Where $\delta[m_i, m_j]$ is the relative cost gain for the identified best mode $m_i$ for the considered coding unit, compared to the other modes $m_j$, with $j=1 \ldots N$, $j \neq i$. The relative cost gain allows evaluating the benefit of the mode $m_i$ compared to the other modes $m_j$, j being different from i.

$\delta[m_i, m_j]$ is determined according to the following equation:

$$\delta[m_i, m_j] = C_k[m_j] - C_k[m_i]$$

Where $C_k[m_{i/j}]$ is a rate-distortion cost evaluated for each coding unit $CU_k$, $k=1 \ldots N_{CU}$, k being the number of the coding unit and $N_{CU}$ the total number of coding units in the picture.

This cost measures the balance between the coding cost when using this mode, and the final distortion (energy of the difference between the coded signal and the original one, computed for instance as the sum of square errors over the pixels of the CU) obtained with the considered mode.

In other words, the cumulative cost gain $\Delta[m_i, m_j]$ relative to a given best mode $m_i$ are updated coding unit per coding unit, each time the mode $m_i$ has been identified as being the best mode for the considered coding unit. This is done for each the $N_m$ possible coding modes.

Now, we referred back to the FIG. 8, more particularly to the selecting step 804. It is considered that the stored statistics are those computing as mentioned in the previous paragraph. In this case, the mode $m_i$ is enabled or disabled from the $N_m$ possible coding modes of a current image according to the following process, as illustrated in FIG. 12.

Initially all modes enabled in the dependency picture are enabled. If a mode is not worthy being used, removing it should not have a huge impact on the rate-distortion cost. So it can be found another mode $m_j$, $j \neq i$, such that $\Delta[m_i, m_j]$ is not too big.

The FIG. 12 describes the proposed selection process. The selection process consists of identifying the coding mode $m_i$ giving the minimum cumulated difference $\Delta[m_i, m_j]$, for $i=1 \ldots N$, $j=1 \ldots N$, $j \neq i$, in step 1201. If $\Delta[m_i, m_j]$ is below a given threshold $\Delta_{MIN}$, step 1202, the mode $m_i$ is set to disabled, step 1203. If not, the process is stopped. Then mode $m_i$ is no more considered in the further analysis of the other modes.

For example, this can be done by setting all $\Delta[m_i, m_j]$ with k=i or l=i to a very large value $\Delta_{MAX}$ (larger than the maximum possible cumulated difference value) in step 1204. By doing this, it is guaranteed that any couple k,l with k or l equal to i will not be selected as a couple with minimum $\Delta[m_i, m_j]$. Then the process is repeated until no more couple (i,j) satisfies condition 1202 can be identified in step 1201.

According to an aspect of the invention, the mode selection process can be implemented at the encoder-only. In such a case, the encoder must signal in the bitstream the modes that are enabled and the modes that are disabled. This signalling must be done in the header of the group of coding units.

In an embodiment, the encoder signals in the bitstream the dependency pictures of each picture. Then the decoder decodes this information and deduces from the statistics of these pictures the enables/disables modes.

According to an aspect of the invention, the mode selection process can also be implemented both at the encoder and decoder sides. In such a case, the complete mode selection process, including the computation of statistics, is specified in the decoder specification. When processing a picture, the decoder computes the statistics, identifies the dependency pictures of a given picture and infers the modes that are enabled or not exactly as described above. This allows saving coding bits used to signal the enabled/disabled modes.

The invention is well adapted to multi-layer video but it can also apply to one-layer video.

The FIGS. 13a and 13b show as an example, a device implementing a method for deriving a set of enabled modes as described above. This device is here incorporated in an encoder. Some references are common with certain references of the encoder in FIG. 2. They designate the same blocks, with the same function. The blocks of the encoder represented in FIG. 2 which are not represented in the FIGS. 13a and 13b are similar for the encoder according to the invention.

As illustrated in FIG. 13a, an encoder according to the invention further comprises a block 805a implementing the processing function 805 represented in FIG. 8. This block is then connected before the frame memory 94. The block 805a comprises another block 1103a implementing the updating function 1103 represented in FIG. 11.

As represented on the complementary FIG. 13b, the encoder also comprises a block 803a which implements the identifying step represented in the FIG. 8. Another block 804a is connected at the output of the identifying block 803a, and implements the selecting function 804 shown in the FIG. 8.

The blocks 803a and 804a are connected between the input of the encoder and the block 92. They receive from the frame memory 94, the stored previously encoded frames.

The FIGS. 14a and 14b show as another example, a device implementing a method for deriving a set of enabled modes as described above. This device is here incorporated in a decoder. Some references are common with certain references of the decoder in FIG. 3. They designate the same blocks, with the same function. The blocks of the decoder represented in FIG. 3 which are not represented in the FIGS. 14a and 14b are similar for the decoder according to the invention.

As illustrated in FIG. 14a, a decoder according to the invention further comprises a block 805b implementing the processing function 805 represented in FIG. 8. This block is then connected before the frame memory 170. The block 805b comprises another block 1103b implementing the updating function 1103 represented in FIG. 11.

As represented on the complementary FIG. 14b, the encoder also comprises a block 803b which implements the identifying step represented in the FIG. 8. Another block 804b is connected at the output of the identifying block 803a, and implements the selecting function 804 shown in the FIG. 8.

The blocks 803b and 804b are connected between the demultiplexer 220 and the entropy decoding block 205. They receive from the frame memory 170, the stored previously encoded frames.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for deriving a set of enabled coding modes relative to the encoding of an image or image portion which forms part of an image sequence, the method comprising:
    obtaining statistics related to enabled coding modes of one or more previously encoded images of the sequence;
    analyzing the statistics and deducing from the analyzed statistics one or more coding modes to be enabled for the current image or image portion; and
    enabling, for the current image or image portion, the one or more coding modes to be enabled.

2. The method according to claim 1, wherein said one or more previously encoded images form a dependency set, and wherein said dependency set is selected based on the similarities between the current image and the previously encoded images.

3. The method according to claim 2, wherein evaluating the similarities is based on the value of at least one characteristic of the considered image, which belongs to a list including the temporal stamp corresponding to the display order of the image, the coding stamp corresponding to the coding order of the image, the index of temporal layer which includes the considered image, quantization parameters, Lagrangian parameters, and the type of the image or image portion.

4. The method according to claim 2, wherein a previously encoded image is included in the set of dependency if:
    it belongs to a set of images delimited by a predefined period including the current image,
    it has the same type as the current image, and
    it belongs to the same temporal layer or the immediately lower temporal layer.

5. The method according to claim 2, wherein a previously encoded image is included in the set of dependency if:
    it belongs to a set of images delimited by a predefined period including the current image,
    it has the same type as the current image, and
    it has the same quantization parameter as, or the closest lower quantization parameter to, the current image.

6. The method according to claim 2, wherein if the current image belongs to one of the P lowest layers of a scalable video data including the current image, P being an integer, a previously encoded image is included in the set of dependency if:
    it belongs to a set of images delimited by a predefined period including the current image,
    it has the same type as the current image, and
    it belongs to the same temporal layer,
otherwise the method further comprises another step for enabling all the possible coding modes for encoding the layers above the second layer in the current image.

7. The method according to claim 2, wherein if the current image belongs to one of the P lowest layers of a scalable video data including the current image, P being an integer, a previously encoded image is included in the set of dependency if:
    it belongs to a set of images delimited by a predefined period including the current image,
    it has the same type as the current image, and
    it has the same quantization parameter as the current image, otherwise the method further comprises another step for enabling all the possible coding modes for encoding the layers above the second layer in the current image.

8. The method according to claim 2, wherein if the current image belongs to the P lowest layers of a scalable video data including the current image, P being an integer, a previously encoded image is included in the set of dependency if:
   it belongs to a set of images delimited by a predefined period including the current image,
   it has the same type as the current image, and
   it has the same Lagrangian parameter as the current image,
otherwise the method further comprises a step for authorizing all the possible coding modes for encoding the current image.

9. The method according to claim 6, wherein P is set equal to the total number of layers in the scalable video, minus 2.

10. The method according to claim 2, wherein evaluating the similarities between the current image and the previously encoded images comprises calculating a distance D function on characteristics $D[VC^{curr},VC]$ where $VC^{curr}$ is a vector of chosen characteristics about the current image, and VC a vector of chosen characteristics about the considered previously encoded image.

11. The method according to claim 10, wherein each vector is defined by $VC=[VC_0, \ldots, VC_N]^T$, wherein T is a transposition operator, N is an integer and $VC_i$ with $i \in [0,N]$ is a given characteristic.

12. The method according to claim 11, wherein it follows that:

$$D[VC^{curr},VC] = w_0 \cdot d(VC_0^{curr},VC_0) + \ldots + w_i \cdot d(VC_i^{curr},VC_i) + \ldots + w_N \cdot d(VC_N^{curr},VC_N),$$

where $w_i$ is a weighting factor related to the corresponding characteristic $VC_i$, and $d(VC_i^{curr},VC_i)$ is a distance measured between characteristics $VC_i^{curr}$ and $VC_i$.

13. The method according to claim 12, wherein the step for identifying the set of dependency comprises, for each previously encoded image, comparing the calculated distance $D[VC^{curr},VC]$ with a predetermined threshold $\lambda$, and adding the considered previously encoded image to the set of dependency's images if $D \leq \lambda$.

14. The method according to claim 1, wherein the step of enabling the coding modes further comprises resetting the enabled coding modes for a current image by enabling all the possible coding modes for the current image.

15. The method according to claim 14, further comprising:
   a step of computing the statistics on a current image based on the current image's enabled coding modes, and
   a step of storing said current image's computed statistics for the selectively enabling step of coding modes for a further image.

16. The method according to claim 15, wherein an image is divisible into coding units which are further divisible into pixels, and the step of computing the statistics on a current image comprises, for each coding unit $CU_k$ of the current image, $k=1, \ldots, N_{CU}$, k being the index of the coding unit and $N_{CU}$ the total number of coding units in the current image:
   a) a step of identifying a best mode $m_i$ of the considered coding unit $CU_k$ among $N_m$ possible coding modes for the current image,
   b) a step of updating a first ratio associated with the identified best mode $m_i$ between the number of coding units using the best mode $m_i$ and the total number of coding units in the current image, and/or
   c) a step of updating a second ratio associated with the identified best mode $m_i$ between the number of pixels using the identified best mode $m_i$ and the total number of pixels in the considered image.

17. The method according to claim 16, further comprising repeating the steps a) to c) until the last coding unit $CU_{N_{CU}}$.

18. The method according to claim 17, further comprising, for each coding mode $m_i$ associated with the coding units of a previously encoded image, a comparing step for enabling the coding mode $m_i$ in the $N_m$ possible coding modes for the current image if the largest value between the first and the second ratio associated with the considered best mode $m_i$ is below a predetermined threshold.

19. The method according to claim 15, wherein an image is divisible into coding units, the step of computing the statistics on a current image comprises, for each coding unit $CU_k$ of the current image, $k=1, \ldots, N_{CU}$, k being the index of the coding unit and $N_{CU}$ the total number of coding units in the current image:
   e) a step of identifying a best mode $m_i$ for the coding unit $CU_k$ among $N_m$ possible coding modes for the current image,
   f) a step of calculating a rate distortion penalty $\Delta[m_i,m_j]$ associated with the identified coding mode $m_i$ compared to the other coding modes $m_j$, with $j \neq i$ and $j=1, \ldots M$, where $\Delta[m_i,m_j]$ is the cumulative cost of the relative cost gains such that:

$$\Delta[m_i,m_j] \Leftarrow \Delta[m_i,m_j] + \delta[m_i,m_j], \text{ and}$$

$$\delta[m_i,m_j] = C_k[m_j] - C_k[m_i]$$

where
   $\delta[m_i,m_j]$ is the relative cost gain for the mode $m_i$ for the considered coding unit $CU_k$ compared to the mode $m_j$,
   $C_k[m_i]$ is the a rate-distortion cost for the identified best mode $m_i$ for the coding unit $CU_k$, and
   $C_k[m_j]$ is the a rate-distortion cost for the coding modes $m_j$ for the coding unit $CU_k$.

20. The method according to claim 19, further comprising repeating the steps e) and f) until the last coding unit $CU_{N_{CU}}$.

21. The method according to claim 20, wherein the step of analyzing the statistics of the previously encoded images comprises for all the coding modes $m_i$ associated with the coding units of a previously encoded image:
   h) a step of identifying a minimal rate-distortion penalty $\Delta[m_i,m_j]$,
   i) a step of comparing the identified minimal rate-distortion penalty with a given threshold,
   j) a step of deducing the enabled coding modes comprising disabling the coding mode $m_i$ from the $N_m$ coding modes for the current image if the identified minimal rate-distortion penalty is below the given threshold.

22. The method according to claim 21, further comprising repeating the steps h) to j) as long as the identified minimal rate-distortion penalty is below the given threshold.

23. The method according to claim 21, wherein said one or more previously encoded images form a dependency set, and wherein said dependency set is selected based on the similarities between the current image and the previously encoded images, evaluating the similarities is based on the value of at least one characteristic of the considered image, which belongs to a list including the temporal stamp corresponding to the display order of the image, the coding stamp corresponding to the coding order of the image, the index of temporal layer which includes the considered image, quantization parameters, Lagrangian parameters, and the type of the image or image portion and the dependency set comprises only one previously encoded image.

24. The method according to claim 1, wherein the image or image portion belongs to a layer of a scalable video comprising several layers.

25. A method for decoding an image or image portion composed of a plurality of coding units, the method comprising receiving encoded data related to the image or image portion to decode and encoded coding mode data defining a set of one or more enabled coding modes for the image or image portion, the set of enabled coding modes being provided by obtaining statistics related to enabled coding modes of one or more previously encoded images of the sequence, analyzing the statistics and deducing from the analyzed statistics one or more coding modes to be enabled for the current image or image portion and enabling, for the current image or image portion, the one or more coding to be enabled;

decoding the encoded data using the set of enabled coding modes; and generating the decoded data.

26. A non-transitory computer readable carrier medium comprising processor executable code for performing a method for deriving a set of enabled coding modes relative to the encoding of an image or image portion in which method forms part of an image sequence, wherein execution of the processor executable code by one or more processors causes the one or more processors to:

obtain statistics related to enabled coding modes of one or more previously encoded images of the sequence, analyzing the statistics and deducing from the analyzed statistics one or more coding modes to be enabled for the current image or image portion, enabling, for the current image or image portion, the coding modes to be enabled.

27. A device configured to derive a set of enabled coding modes relative to the encoding of an image or image portion which forms part of an image sequence, by, obtaining statistics related to enabled coding modes of one or more previously encoded images of the sequence, analyzing the statistics and deducing from the analyzed statistics one or more coding modes to be enabled for the current image or image portion and enabling, for the current image or image portion, the one or more coding modes to be enabled.

* * * * *